W. H. HORN.
Wagon-Jack.

No. 162,554.

Patented April 27, 1875.

WITNESSES:
E. Wolff
J. H. Scarborough

INVENTOR:
W. H. Horn
BY
ATTORNEYS.

THE GRAPHIC CO. PHOTO-LITH. 39 & 41 PARK PLACE, N.Y.

UNITED STATES PATENT OFFICE.

WILLIAM HENRY HORN, OF SANTA CRUZ, CALIFORNIA.

IMPROVEMENT IN WAGON-JACKS.

Specification forming part of Letters Patent No. 162,554, dated April 27, 1875; application filed March 6, 1875.

*To all whom it may concern:*

Figure 1:
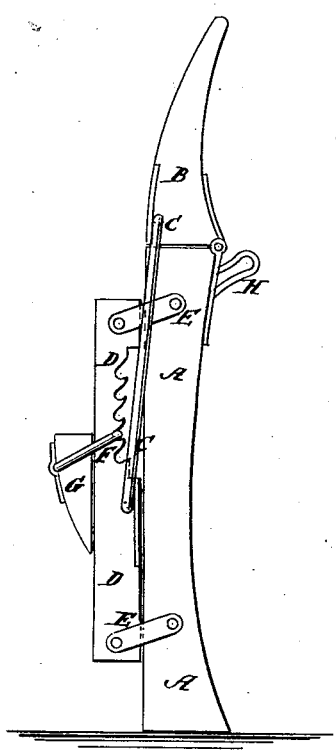
Figure 2:
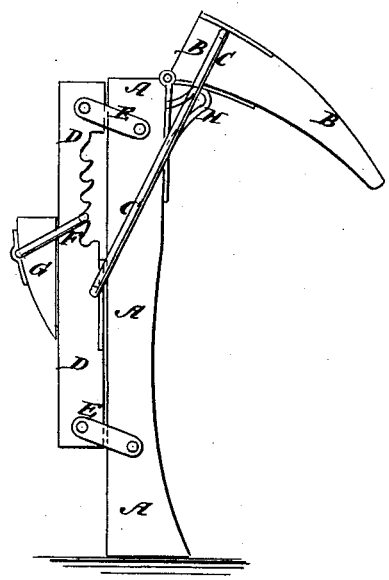

Be it known that I, WILLIAM HENRY HORN, of Santa Cruz, in the county of Santa Cruz and State of California, have invented a new and useful Improvement in Wagon-Jacks, of which the following is a specification:

Figure 1 is a side view of my improved jack, shown in position to be set under the axle of the wagon. Fig. 2 is a side view of the same, shown in position for supporting the axle of the wagon.

Similar letters of reference indicate corresponding parts.

My invention has for its object to furnish an improved wagon-jack, simple and compact in construction, and convenient in use.

The invention consists in an improved wagon-jack, formed by the combination of the standard, the hinged lever, the pivoted link or loop, the sliding toothed bar, the link or loop, the adjustable block, and the stop with each other, as hereinafter fully described.

A is the upright or standard of the jack, to the rear edge of the upper end of which is hinged the rear edge of the lower end of the lever B. The lever B is so formed that when turned into an upright position it may be a continuation of the standard A. To the lever B, near the forward corner of its lower end, is pivoted the upper end of a loop or link, C, the lower end of which is pivoted to the rear middle part of the bar D, which is placed upon the forward edge of the standard A, and is connected with and kept in place upon said standard by short pivoted bars E. Upon the rear or inner edge of the bar D are formed ratchet-teeth to receive the upper end of a loop or link, F, the lower end of which is pivoted to the block G, so that by moving the link F from one to another of the teeth of the bar D, the block G may be adjusted to the height of the axle to be raised. To the upper part of the rear side of the standard A is attached a stop, H, to prevent the lever B from dropping down too far when turned down.

In using the jack the lever B is turned up into the position shown in Fig. 1, which lowers the bar D to its lowest position. The block G is then adjusted to the height of the axle to be raised, and the jack is adjusted to bring the block G beneath said axle. The lever B is then turned down to rest upon the stop H. This movement raises the bar D and block G, raising the axle. As the lever B is lowered into the position shown in Fig. 2, the loop or link C passes back of the axis of the hinge of the said lever B, and the various parts of the jack are locked in position, supporting the axle in its raised position.

Having thus described my invention, I claim as new and desire to secure by Letters Patent—

An improved wagon-jack, formed by the combination of the standard A, the hinged lever B, the pivoted link or loop C, the sliding toothed bar D, the link F, the adjustable block G, and the stop H with each other, substantially as herein shown and described.

WILLIAM HENRY HORN.

Witnesses:
   G. BOWMAN,
   S. H. BAILEY.